(12) United States Patent
Ersoy et al.

(10) Patent No.: US 8,932,426 B2
(45) Date of Patent: Jan. 13, 2015

(54) PIPE FUSION FITTING AND INSTALLATION METHOD

(75) Inventors: Daniel Allen Ersoy, Lincolnwood, IL (US); Ernest Lever, Arlington Heights, IL (US)

(73) Assignee: Gas Technology Institute, Des Plaines, IL (US)

( * ) Notice: Subject to any disclaimer, the term of this patent is extended or adjusted under 35 U.S.C. 154(b) by 228 days.

(21) Appl. No.: 12/851,567

(22) Filed: Aug. 6, 2010

(65) Prior Publication Data

US 2012/0031542 A1 Feb. 9, 2012

(51) Int. Cl.
*B29C 65/06* (2006.01)
*B29C 65/00* (2006.01)
*B29C 65/34* (2006.01)
*F16L 47/03* (2006.01)
*F16L 47/34* (2006.01)
*B29C 65/36* (2006.01)

(52) U.S. Cl.
CPC ......... *B29C 66/52241* (2013.01); *B29C 65/342* (2013.01); *B29C 65/3432* (2013.01); *F16L 47/03* (2013.01); *F16L 47/34* (2013.01); *B29C 66/52296* (2013.01); *B29C 65/362* (2013.01); *B29C 66/12441* (2013.01); *B29C 65/3476* (2013.01); *B29C 65/3468* (2013.01); *B29C 65/52298* (2013.01)
USPC ...................................................... 156/272.2

(58) Field of Classification Search
USPC ........ 156/73.5, 60, 272.2, 293, 303.1; 29/428
See application file for complete search history.

(56) References Cited

U.S. PATENT DOCUMENTS

| | | | | |
|---|---|---|---|---|
| 5,088,194 A | * | 2/1992 | Lasko | 29/890.148 |
| 5,223,189 A | * | 6/1993 | Friedrich | 264/31 |
| 5,632,952 A | * | 5/1997 | Mandich | 264/516 |
| 2005/0081934 A1 | * | 4/2005 | Douglas et al. | 138/99 |
| 2007/0210576 A1 | * | 9/2007 | Shook et al. | 285/197 |

FOREIGN PATENT DOCUMENTS

| | | | | |
|---|---|---|---|---|
| JP | 05026375 A | * | 2/1993 | |
| JP | 11082827 A | * | 3/1999 | |

OTHER PUBLICATIONS

Machine Translation of JP 11082827 A, Mar. 1999.*

* cited by examiner

*Primary Examiner* — Daniel McNally
(74) *Attorney, Agent, or Firm* — Pauley Petersen & Erickson

(57) ABSTRACT

A method for connecting a pipe fitting with a buried pipe from above ground in which the top, outer wall surface of the buried pipe is exposed to an aboveground location, producing an exposed outer wall surface. An opening into the pipeline is formed at the exposed outer wall surface following which a fitting to be connected with the pipeline is inserted through the opening into the pipeline and connected with a circumferential pipe surface encircling the opening into the pipeline. Preferably, keyholing techniques are used to carry out the steps of the method so as to substantially limit the amount of excavation required compared with conventional pipe fitting connection procedures.

13 Claims, 5 Drawing Sheets

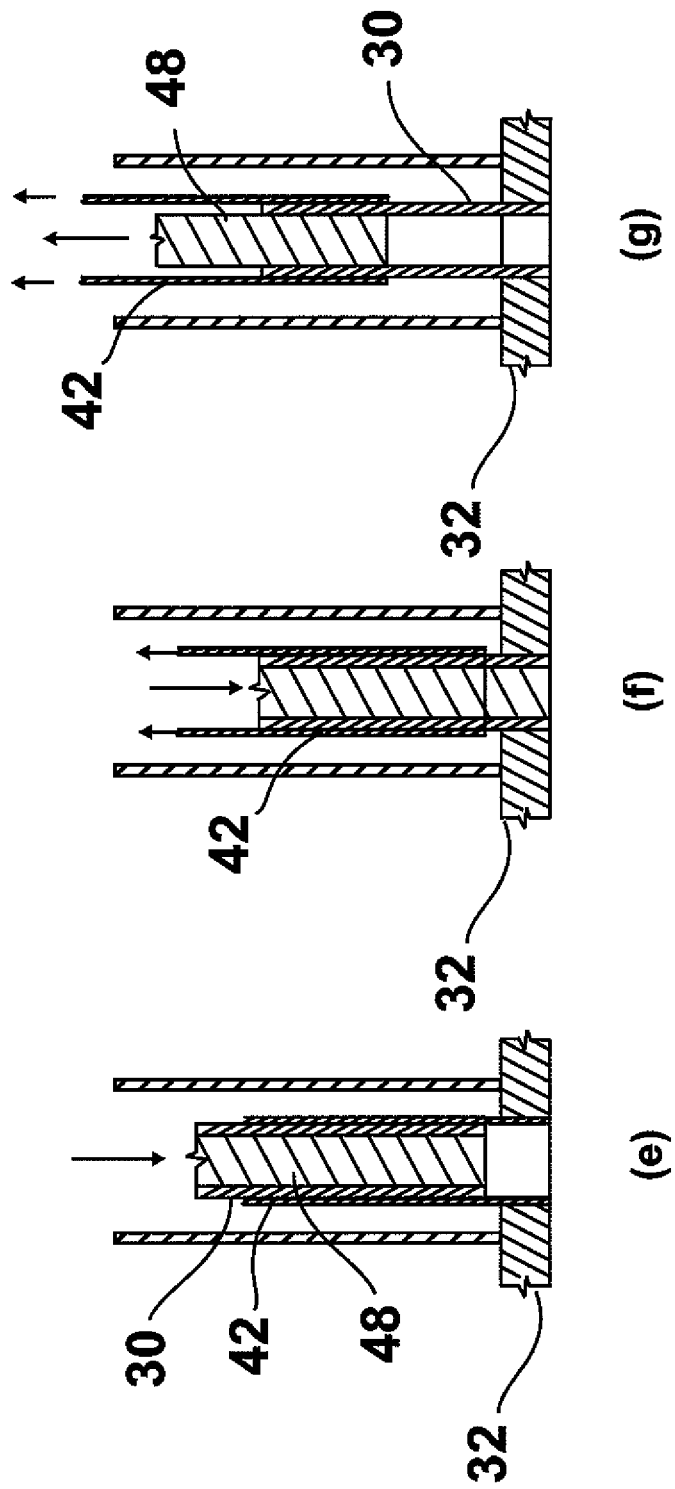

PIPE FUSION FITTING AND INSTALLATION METHOD

BACKGROUND OF THE INVENTION

1. Field of the Invention

This invention relates to a method for connecting a pipe fitting to a pipe. In one aspect, this invention relates to a method for connecting a pipe fitting to a wall of a pipe, which pipe is underground and in-service. In one aspect, this invention relates to a method for connecting a plastic pipe fitting with a plastic pipe using fusion means for fusing the plastic pipe fitting with the plastic pipe. In another aspect, this invention relates to a method for connecting a pipe fitting to a wall of an underground pipe without substantial excavation to expose the pipe.

2. Description of Related Art

Access to underground natural gas pipelines to perform tasks such as internal pipe inspection, pipe repair, and the connection of pipe fittings to the pipe to enable a variety of activities requiring access to the interior of the pipe, such as the connection of natural gas service lines between the customers and the underground pipeline supply, generally requires excavation to expose the underground pipeline. The standard technique for accessing the underground pipes involves excavation through three-feet-by-four-feet bell holes followed by appropriate restoration, which frequently requires the use of heavy equipment, e.g. backhoes and dump trucks, to remove the ground covering the pipeline and restore the ground after completion of work on the pipeline.

In recent years, keyhole technology has been used by some utilities and contractors to perform the required excavation. Keyhole technology is the practice of carrying out repairs, maintenance, and other procedures on underground utility piping from above ground with the assistance of long-handled tools and typically requires an opening in the ground no larger than about 18 inches across. The limited amount of available space in which to work on the exposed pipeline has required the development of a variety of new tools and procedures for performing the required tasks on the pipeline. One of the tasks frequently performed is the connection of a pipe fitting. Current state-of-the-art involves connection of the pipe fitting by a variety of means to the external surface of the pipe wall, some of which require a full encirclement of the pipeline. The pipe fittings may be connected by any of a number of available processes including electro-fusion, heat-fusion, cold adhesive fusion, and mechanical means. Electro-fusion is a process for joining two plastic components to each other in which one component comprising an embedded heating element is brought into contact with the other component and an electric power source supplies an electric current to the heating element, causing the heating element to produce heat, thereby melting the plastic material in both plastic components in the vicinity of the heating element. The melted materials of the components flow together and form a homogeneous connection following a cooling down period. Heat-fusion is a process for joining two plastic components to each other in which the components are heated to the melting temperature of the components, brought into contact with each other, and allowed to cool. Cold adhesive fusion is a process in which the two plastic components are joined together by an adhesive without heating the components.

SUMMARY OF THE INVENTION

It is one object of this invention to provide a method for connecting a pipe fitting, such as a pipe tee or pipeline access port, with an in-service underground pipeline.

It is another object of this invention to provide a method for connecting a pipe fitting with an in-service underground pipeline using keyholing technology.

These and other objects of this invention are addressed by a method for connecting a plastic pipe fitting with a buried plastic pipeline in which the top, outer wall surface of the buried pipeline is exposed to an aboveground location, producing an exposed outer wall surface. Preferably, the outer wall surface of the buried pipeline is exposed by means of a "keyhole" excavation. An opening into the pipeline is formed at the exposed outer wall surface following which a fusible portion of a fitting to be connected with the pipeline is inserted through the opening into the pipeline and connected with a circumferential pipe surface encircling the opening into the pipeline and extending between the outer wall surface and the inside wall surface of the pipeline, forming a gas tight seal between the pipe fitting and the circumferential pipe surface.

Benefits of the method of this invention include elimination of the need for a fitting base typically employed with conventional externally applied fittings; elimination of the need for an o-ring typically required by conventional bolt-on external mechanical fittings; elimination of the need for a trenched excavation since the method can be done from above ground; and elimination of the need for significant cleaning and large surface area scraping when compared with conventional external electro-fusion fittings.

BRIEF DESCRIPTION OF THE DRAWINGS

These and other objects and features of this invention will be better understood from the following detailed description taken in conjunction with the drawings, wherein.

DETAILED DESCRIPTION OF THE PRESENTLY PREFERRED EMBODIMENTS

As used herein, the term "pipe fitting" refers to a pipe or tube section used to provide access to an interior of a pipe through a wall of the pipe. The number and form of pipe fittings deemed to be within the scope of this invention are too numerous to be listed herein. Examples of pipe fittings deemed to be within the scope of this invention include, but are not limited to, straight pipe, couplings, elbows, tees, and reducers.

Figure 1:
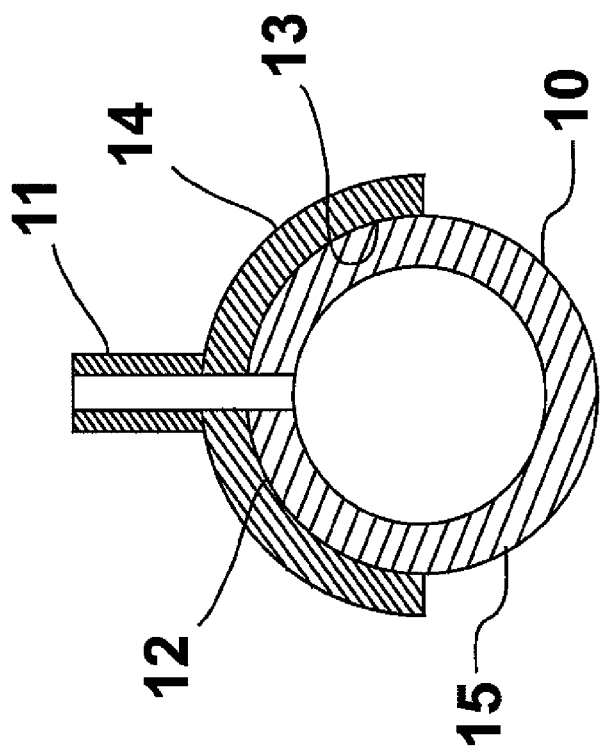
FIG. 1 is a radial cross-sectional view of a pipeline showing a conventional external fusion fitting installed on a pipe.

FIG. 1 shows a conventional fusion fitting 11 comprising a fusible portion 14 attached with the outer pipe wall surface of a pipe 10 in accordance with current practice. The fusion surface 12 is the contact area between the outer pipe wall surface 15 of the pipe 10 and the inner or underside surface 13 of the fusible portion 14 of the fitting. Because the fitting is attached to the outer surface of the pipe, which is exposed to the surrounding soil, it is frequently problematic to obtain complete contact between the fusible portion of the fusion fitting and the pipe due to the presence of soil and other contaminants on the outer surface of the pipe.

Figure 2:
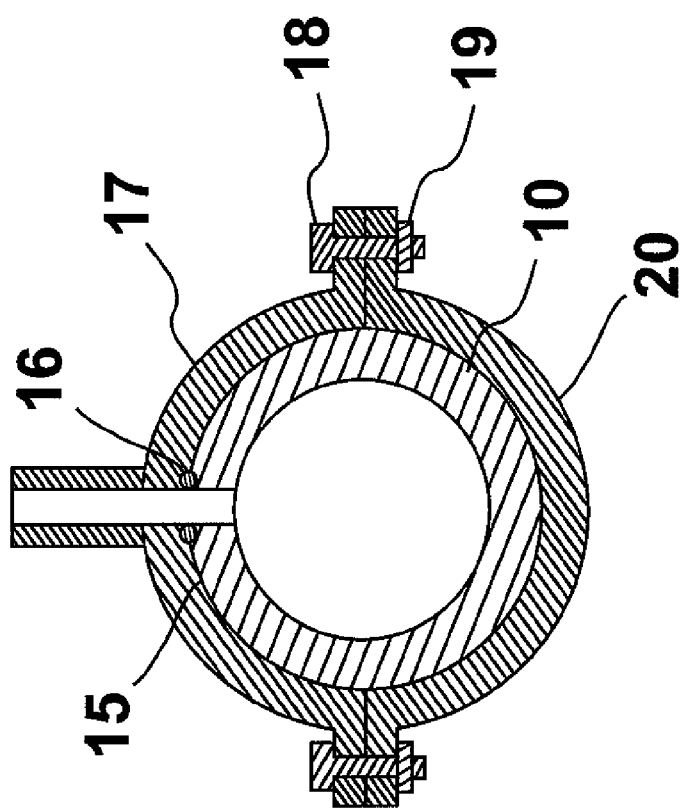
FIG. 2 is a radial cross-sectional view of a pipeline showing a conventional external mechanical fitting mechanically fixed to the pipe.

FIG. 2 is a diagram showing a conventional external mechanical pipe fitting connected with a pipe 10. The mechanical fitting comprises an upper half 17 and a lower half 20 held together by bolts 18 and nuts 19 whereby the fitting encircles the pipe. These fittings typically employ an o-ring type seal 16 at the surface 15 between the pipe 10 and the upper half of the fitting. It will be appreciated by those skilled in the art that one of the disadvantages of such an external fitting is the requirement of excavation around the entire circumference of the pipe to enable full encirclement of the fitting.

Figure 3:
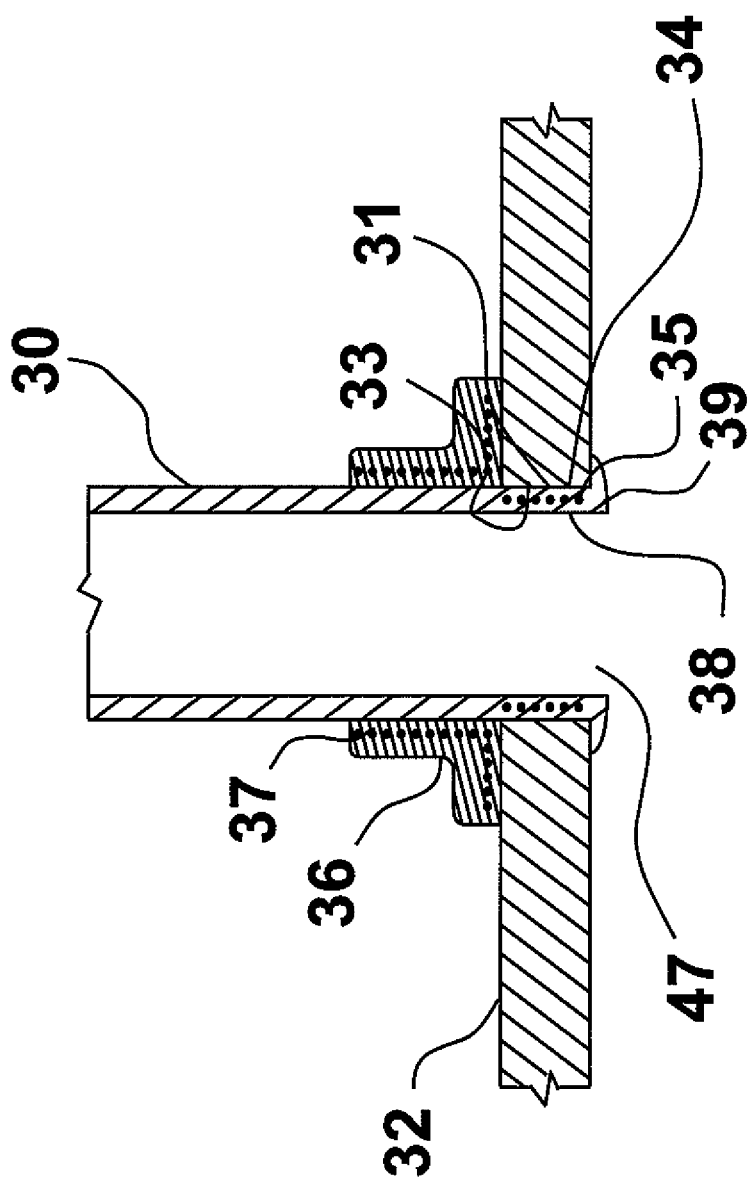
FIG. 3 is a lateral cross-sectional view of a fusion pipe fitting installed in accordance with the method of this invention.

FIG. 3 is a diagram showing a fusion pipe fitting 30 comprising a fusible portion 31 connected with the pipe wall 32 of a pipe in accordance with one embodiment of this invention. As shown therein, the fusion surface is the contact area between the circumferential pipe surface 33 of the pipe opening and a circumferential pipe surface facing surface 34 of the fusible portion of the fitting. In accordance with the embodiment shown in FIG. 3, the fusion pipe fitting 30 comprises a plurality of electrofusion wires 35 proximate the fusion surface which, upon application of an electrical current, results in fusion of the circumferential pipe surface facing surface 34 of the fusible portion 31 of the pipe fitting with the circumferential pipe surface 33 of the pipe opening. In accordance with one embodiment of this invention, the insertion end 38 of the pipe fitting is provided with outwardly extending profiles 39 which extend beyond the opening perimeter to contact the inside surface of the pipe wall to prevent removal of the fitting. The fusion pipe fitting of this invention provides stability, strength, and a pressure tight seal to attach another fitting or service line without the need of full encirclement, i.e. it is "baseless" in design, allowing the installation operation to be performed entirely from above ground by means of a "keyhole" excavation. A further advantage of the method of installation of the fusion pipe fitting in accordance with this invention is a substantial reduction or possible elimination of pipe wall cleaning required for connection of the fusion pipe fitting with the pipe wall when compared with external fusion fittings.

In accordance with one embodiment of this invention, the stability of the connection between the fusion pipe fitting and the pipe wall may be further enhanced by the installation of a fusible collar 36 containing at least one electrofusion wire 37 around the fusion pipe fitting 30 at the intersection of the fusion pipe fitting and the pipe wall. In accordance with one embodiment of this invention, fusible collar 36 is fused to the fusion pipe fitting 30 and the pipe wall 32.

It will be appreciated by those versed in the art that other means for fusing the fusion pipe fitting with the pipe wall may be employed, and such other means are deemed to be within the scope of this invention. For example, in accordance with one embodiment of this invention, a cold adhesive fusion process may be employed. In accordance with another embodiment of this invention, a heat fusion process may be employed. In accordance with yet another embodiment of this invention, heat sufficient to provide fusion of the fusion pipe fitting with the pipe wall may be produced by friction between the outer surface of the fusion pipe fitting and the circumferential pipe surface around the opening in the pipe wall resulting from rapid movement of the fusible portion of the pipe fitting within the pipe opening.

Figure 4:
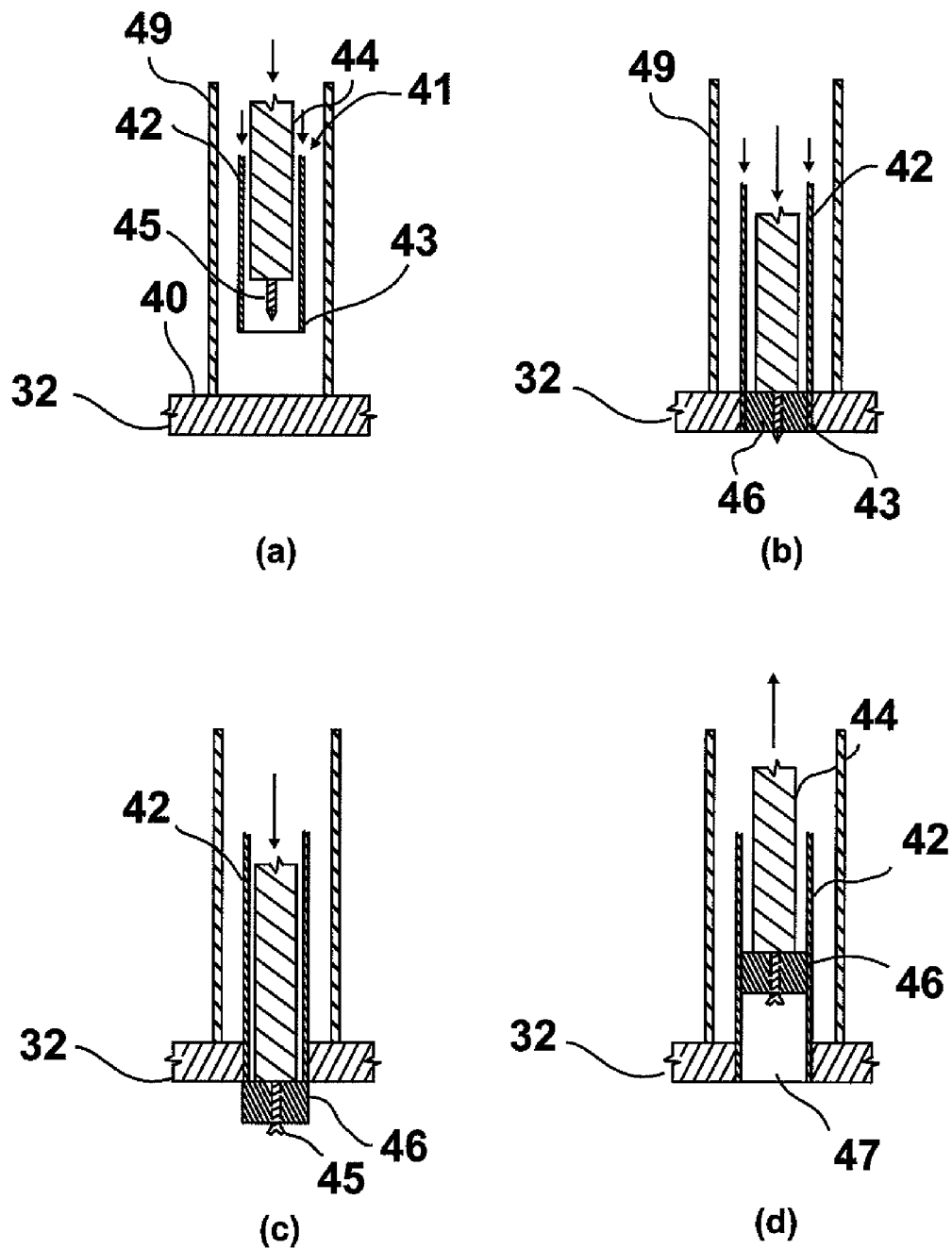
FIG. 4 is a diagram showing the installation of a fusion pipe fitting in accordance with one embodiment of the method of this invention.

Installation of the fusion pipe fitting in accordance with one embodiment of the method of this invention (FIG. 4) employing heat fusion comprises the steps of exposing the top, outer pipe wall surface 40 of the pipe wall 32 to an above ground location from which the fitting 30 is to be installed. In accordance with one preferred embodiment of this invention, the surface is exposed through the use of a keyhole excavation process. Equipment for keyhole excavation is commercially available and well known to those skilled in the art. Once the outer pipe wall surface has been exposed, the keyhole excavation tool is removed from the keyhole and a pipe tapping tool 41 disposed within a stuffing box 49, in accordance with one embodiment of this invention, is used to form an opening in the pipe wall (FIG. 4(a)). Suitable pipe tapping tools for tapping a pipe are commercially available and well known to those skilled in the art. The pipe tapping tool in accordance with one embodiment of the method of this invention comprises a hollow cut out punch 42, made of a heat conductive material, such as a metal, having a cutting end 43. Disposed within the hollow cut out punch is a drill and coupon removal tool 44 having a laterally expandable pilot drill 45. Upon lowering of the pipe tapping tool onto the outer surface of the pipe wall, the cutting end of the cut out punch, which, in accordance with one embodiment, is heated, cuts through the pipe wall 32, producing a cut out plug or coupon 46 and forming an opening 47 in the pipe wall encircled by a circumferential pipe surface extending between the outer pipe wall surface and the inside pipe wall surface of the pipe. The pilot drill 45 bores through the coupon (FIG. 4(b)), at which point it is laterally extended as shown in FIG. 4(c) to prevent the coupon from separating from the drill and coupon removal tool and falling into the pipe. The drill and coupon removal tool is removed from the interior of the hollow cut out punch (FIG. 4(d)), which remains in place to maintain the integrity of the opening 47 in the pipe wall. Subsequently, as shown in FIG. 4(e), a fusion pipe fitting 30 is lowered through the interior of the cut out punch 42 together with an internal stiffener 48 disposed within the pipe fitting, sized to preclude the pipe fitting from pulling away from the circumferential pipe surface of the opening during the fusion process. The internal stiffener, which, in accordance with one embodiment of this invention, is made of a heat conductive material, is heated so as to promote, in combination with heat from the heated cut out punch, substantially uniform heating across the thickness of the portion of the fusion pipe fitting to be fused with the circumferential pipe surface of the opening. To enable heat fusion of the fusion pipe fitting to the circumferential pipe surface of the opening, the cut out punch 42 is removed from around the fusion pipe fitting (FIG. 4(f)), enabling direct contact between the outer surface of the fusion pipe fitting and the circumferential pipe surface. Following completion of the fusion process, the internal stiffener 48 is then removed (FIG. 4(g)).

As previously indicated, in accordance with one embodiment of this invention, at least one of the cut out punch 42 and the internal stiffener 48 is heated. Any suitable means for heating the punch and/or stiffener, e.g. IR heating, electromagnetic heating, and induction heating, may be employed for heating the punch and stiffener as desired.

While in the foregoing specification this invention has been described in relation to certain preferred embodiments thereof, and many details have been set forth for the purpose of illustration, it will be apparent to those skilled in the art that the invention is susceptible to additional embodiments and that certain of the details described herein can be varied considerably without departing from the basic principles of the invention.

We claim:

1. A method for connecting a pipe fitting with a pipe wall of a buried pipeline comprising the steps of:
    exposing a top, outer pipe wall surface of said pipe wall to an aboveground location, producing an exposed outer pipe wall surface;

providing a circumferential pipe surface between said outer pipe wall surface and an inner pipe wall surface enclosing an opening in said pipe wall;

inserting a portion of said pipe and an internal stiffener through said opening, wherein a leading end of said pipe comprises a laterally extending, compressible projection which expands to contact said inner pipe wall surface of said pipeline, and the leading end of said pipe further includes an electrofusion wire;

connecting said portion of said pipe with said circumferential pipe surface by a process using the electrofusion wire selected from the group consisting of electro-fusion, and heat fusion, forming a seal between said pipe and said circumferential pipe surface, wherein the internal stiffener prevents said pipe from pulling away from said circumferential pipe surface during the connecting process; and removing the internal stiffener from said pipe after the connecting process.

2. The method of claim 1, wherein said top, outer pipe wall surface of said buried pipeline is exposed by a keyholing process.

3. The method of claim 1, wherein said pipeline is an inservice pipeline.

4. A method for connecting a pipe with a pipeline comprising the steps of:

forming an opening in a pipe wall of the pipeline, said opening sized to accommodate said pipe;

inserting said pipe and an internal stiffener into the opening; and connecting said pipe having an electrofusion wire to a circumferential pipe surface by a process selected from the group consisting of electro-fusion, heat fusion, friction heating, and combinations thereof enclosing said opening and extending between an outer surface of said pipe wall and an inside surface of said pipe wall, forming a substantially gas tight seal therebetween, wherein a leading end of said pipe comprises a laterally extending, compressible projection which expands to contact said inside surface of said pipe wall.

5. The method of claim 4, wherein said pipeline is an inservice pipe.

6. The method of claim 5, wherein said pipeline is underground.

7. A method for connecting a pipe with a buried pipeline comprising the steps of:

exposing a top, outer wall surface of said buried pipeline to an aboveground location, producing an exposed outer wall surface;

forming an opening sized to accommodate said pipe at said exposed outer wall surface into said pipeline;

inserting the pipe and an internal stiffener through said opening and into said pipeline, the pipe including an electrofusion wire in a leading end of the pipe; and connecting said pips with a circumferential pipe surface encircling said opening and extending between said outer wall surface and an inside wall surface of said pipeline by a process selected from the group consisting of electro-fusion, heat fusion, friction heating, and combinations thereof, wherein a leading end of said pipe comprises a laterally extending, compressible projection which expands to contact said inside wall surface of said pipeline.

8. The method of claim 7, wherein said top, outer wall surface of said buried pipeline is exposed by a keyholing process.

9. The method of claim 7, wherein said pipeline is an in-service pipeline.

10. The method of claim 7, wherein a coupon produced by said forming of said opening is removed from said pipeline to an above ground location.

11. The method of claim 7, wherein said pipe is fitted with a peripheral collar, which peripheral collar is connected with said outer wall surface of said pipeline.

12. A method for connecting from above ground a pipe with a buried pipeline comprising the steps of:

keyholing down to said buried pipeline, thereby exposing a top, outer wall surface of said pipeline;

forming an opening at said top, exposed outer wall surface to an interior of said pipeline; and inserting said pipe and an internal stiffener, the pipe including an electrofusion wire in a leading end, through said opening into said pipeline and connecting said pipe with a circumferential pipe surface encircling said opening and extending between said outer wall surface and an inside wall surface of said pipeline by at least one of electro-fusion, heat fusion, and friction heating, wherein a leading end of said pipe comprises a laterally extending, compressible projection which expands to contact said inside wall surface of said pipeline.

13. The method of claim 12, wherein said pipeline is an in-service pipeline.

* * * * *